US008832239B2

(12) United States Patent
Assuncao et al.

(10) Patent No.: US 8,832,239 B2
(45) Date of Patent: Sep. 9, 2014

(54) SYSTEM, METHOD AND PROGRAM PRODUCT FOR OPTIMIZING VIRTUAL MACHINE PLACEMENT AND CONFIGURATION

(75) Inventors: Marcos Dias De Assuncao, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/245,002

(22) Filed: Sep. 26, 2011

(65) Prior Publication Data

US 2013/0080619 A1    Mar. 28, 2013

(51) Int. Cl.
G06F 15/16 (2006.01)
H04L 29/08 (2006.01)
H04L 29/06 (2006.01)

(52) U.S. Cl.
CPC .... H04L 29/06027 (2013.01); H04L 29/08072 (2013.01)
USPC .............. 709/220; 709/203; 709/224; 705/51

(58) Field of Classification Search
CPC .................. H04L 29/06027; H04L 29/08117; H04L 29/08072
USPC ................. 709/223, 226, 229, 220, 203, 228; 705/51
See application file for complete search history.

(56) References Cited

U.S. PATENT DOCUMENTS

| | | | |
|---|---|---|---|
| 7,779,097 B2 * | 8/2010 | Lamkin et al. | 709/223 |
| 8,019,986 B2 * | 9/2011 | Chaudhari et al. | 713/100 |
| 8,121,966 B2 * | 2/2012 | Routray et al. | 706/46 |
| 8,468,143 B1 * | 6/2013 | Oztekin et al. | 707/706 |
| 8,495,196 B2 * | 7/2013 | Harrang et al. | 709/223 |
| 8,615,648 B2 * | 12/2013 | Chaudhari et al. | 713/100 |
| 2006/0161635 A1 * | 7/2006 | Lamkin et al. | 709/217 |
| 2008/0126171 A1 * | 5/2008 | Baldwin et al. | 705/9 |
| 2009/0307166 A1 * | 12/2009 | Routray et al. | 706/46 |

OTHER PUBLICATIONS

Geng et al., "Interestingness measures for data mining: A survey", "ACM Computing Surveys," Publisher: ACM, Sep. 2006.

Orgerie et al. "Save Watts in your Grid: Green Strategies for Energy-Aware Framework in Large Scale Distributed Systems", "Proceedings of the 14th IEEE International Conference on Parallel and Distributed Systems", Feb. 12, 2008, Publisher: IEEE.

Ferreto et al. , "Server consolidation with migration control for virtualized data centers Original Research Article," Future Generation Computer Systems, Apr. 16, 2011.

* cited by examiner

*Primary Examiner* — Khanh Dinh
(74) *Attorney, Agent, or Firm* — Law Office of Charles W. Peterson, Jr.; Louis J. Percello, Esq.

(57) ABSTRACT

A shared resource system, method of optimizing resource allocation in real time and computer program products therefor. At least one client device includes an optimization agent monitoring resource usage and selectively suggesting changes to resource configuration for the client device. A management system, e.g., in a cloud environment selectively makes resource capacity available to client devices and adjusts resource capacity available to client devices in response to the optimization agent. Client devices and provider computers connect over a network. The client devices and provider computer pass messages to each other over the network.

19 Claims, 9 Drawing Sheets

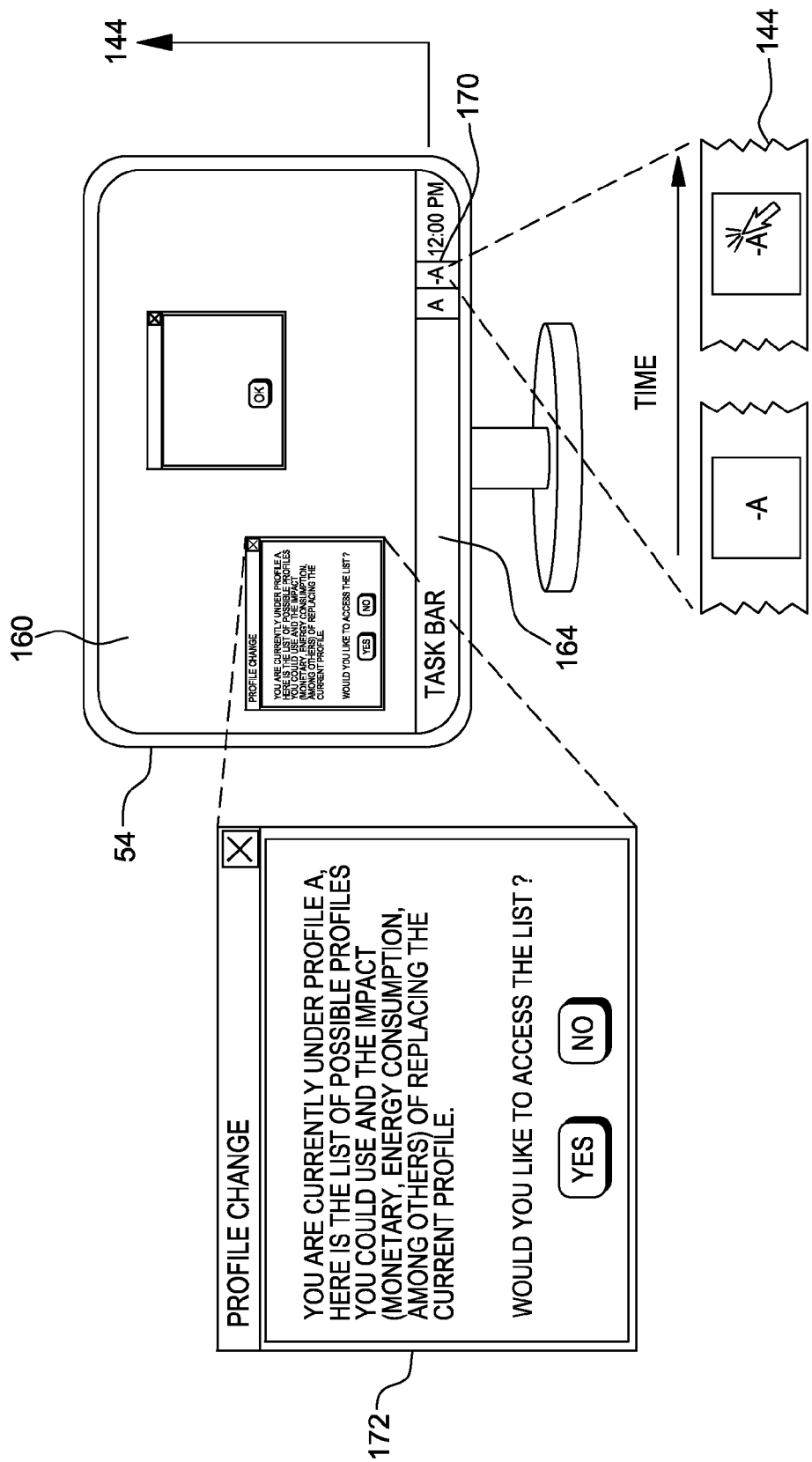

SYSTEM, METHOD AND PROGRAM PRODUCT FOR OPTIMIZING VIRTUAL MACHINE PLACEMENT AND CONFIGURATION

BACKGROUND OF THE INVENTION

1. Field of the Invention

The present invention is related to shared resource allocation and more particularly to reconfiguring virtual machines for optimized resource allocation and minimized energy waste.

2. Background Description

For any modern organization acquiring and managing Information Technology (IT) is a major budgetary concern. Moreover, the local IT hardware is seldom used at full capacity. So to reduce IT infrastructure costs and waste, instead of acquiring physical hardware, organizations increasingly are sharing resources by replacing some local computers with virtual machines (VMs). Each VM provides a local virtual desktop and runs on a remote physical server. Each desktop has allocated capacity (e.g. disk space, processing resources and memory) and is configured (software stack and licenses) for its intended purpose and expected needs. A key problem to managing these VM desktops is determining optimal capacity and configuration to allocate to each VM.

A typical state of the art service provider allocates/places physical resources for each VM based primarily on provider system optimization, on workload predictions and on results from continuously monitoring VM resource usage. Over-allocation, wastes resources and energy and reduces the capacity available to other users. Under-allocation impairs the users Quality-of-Service (QoS). Preferably, adequate IT resources are allocated without waste, and while also maintaining the desktop user's QoS.

System designers have investigated user/usage profiling and feedback in an effort to further optimize and improve service provider efficiency. User/usage profiles have been generated and used, for example, to deliver targeted content such as user targeted advertisements. Those user profiles have been categorized, for example, through analysis of web usage or mobile browser activity to infer demographic data. User feedback can include reporting software failures and performance degradation; expressing satisfaction with, and improve the quality of provided web content and advertisements; and involve them in the process of classifying emails for spam prevention.

Users can assist administrators in better defining initial desktop configurations and optimizing initial VM placement. For example, a resource management system may provide users with options that change system demands, e.g., to optimize energy consumption and systems energy efficiency. Once placed, however, the provider does not consider user feedback, even for subsequent attempts to consolidate system workload or optimize system resource allocation.

Thus, there is a need for allowing users to provide feedback with respect to a current desktop configuration and capacity, and for allowing users to indicate willingness to update the current desktop configuration for more efficient use of resource, by reducing the desktop capacity; and more particularly, there is a need for reconfiguring virtual desktops in response to such feedback, for example, consolidating the desktops onto fewer servers, thereby reducing IT costs, and further, understanding whether the current desktop configuration is appropriate for each user according to different respective usage profiles.

SUMMARY OF THE INVENTION

A feature of the invention is reduced shared resource energy consumption;

Another feature of the invention is optimized allocation of shared resources in a cloud environment;

Yet another feature of the invention is that cloud environment users are allowed to adjust allocated resources on the fly, whenever the user's client device identifies resource excess that has been allocated for a particular user and/or when the user is unsatisfied with a current resource allocation.

The present invention relates to a shared resource system, method of optimizing resource allocation in real time and computer program products therefor. At least one client device includes an optimization agent monitoring resource usage and selectively suggesting changes to resource configuration for the client device. A management system, e.g., in a cloud environment selectively makes resource capacity available to client devices and adjusts resource capacity available to client devices in response to the optimization agent. Client devices and provider computers connect over a network. The client devices and provider computer pass messages to each other over the network.

BRIEF DESCRIPTION OF THE DRAWINGS

The foregoing and other objects, aspects and advantages will be better understood from the following detailed description of a preferred embodiment of the invention with reference to the drawings, in which:

FIG. 8B shows an example of the user using the desktop on device to requesting another profile.

DESCRIPTION OF PREFERRED EMBODIMENTS

Figure 1:
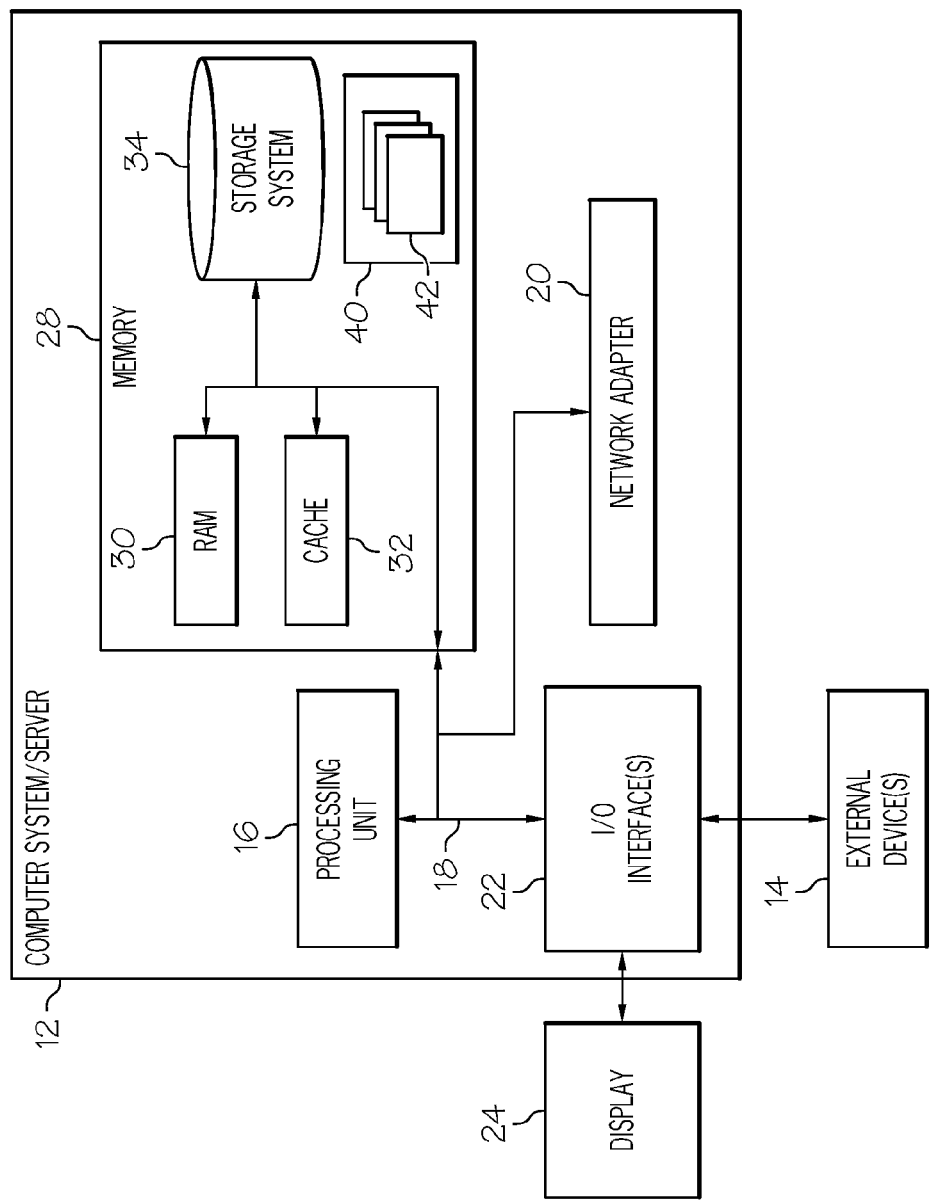
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
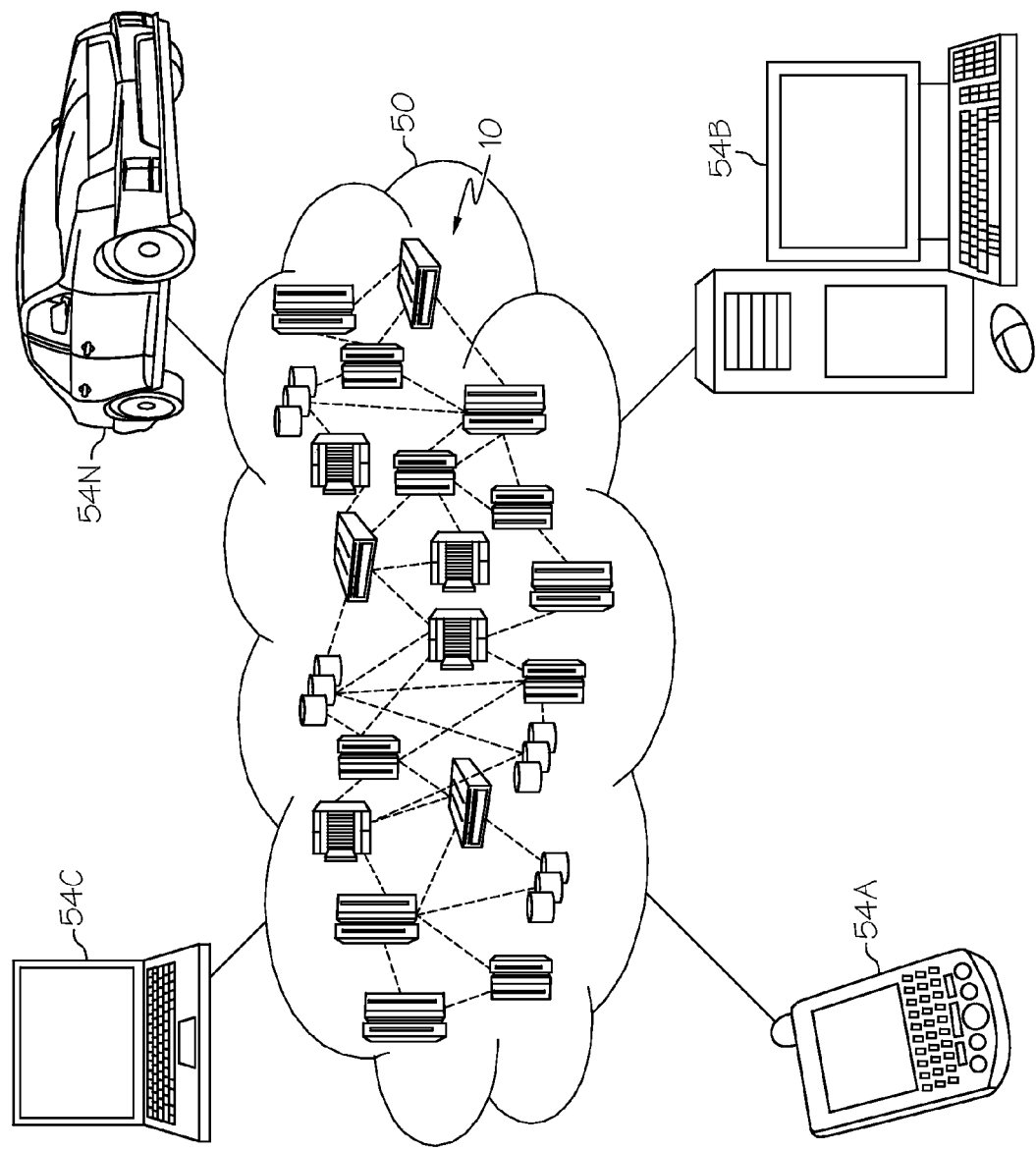
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
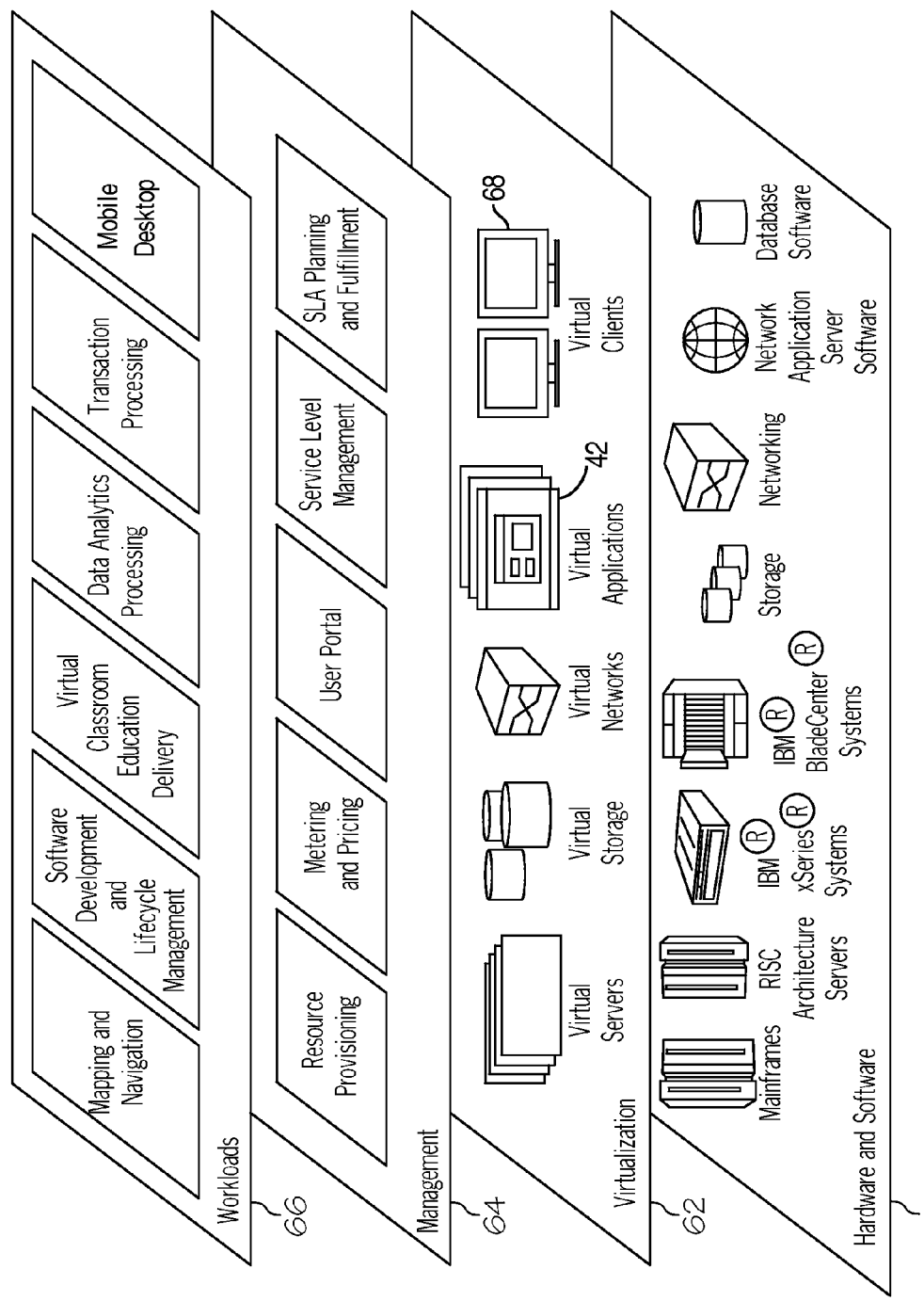
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktop.

Figure 4:
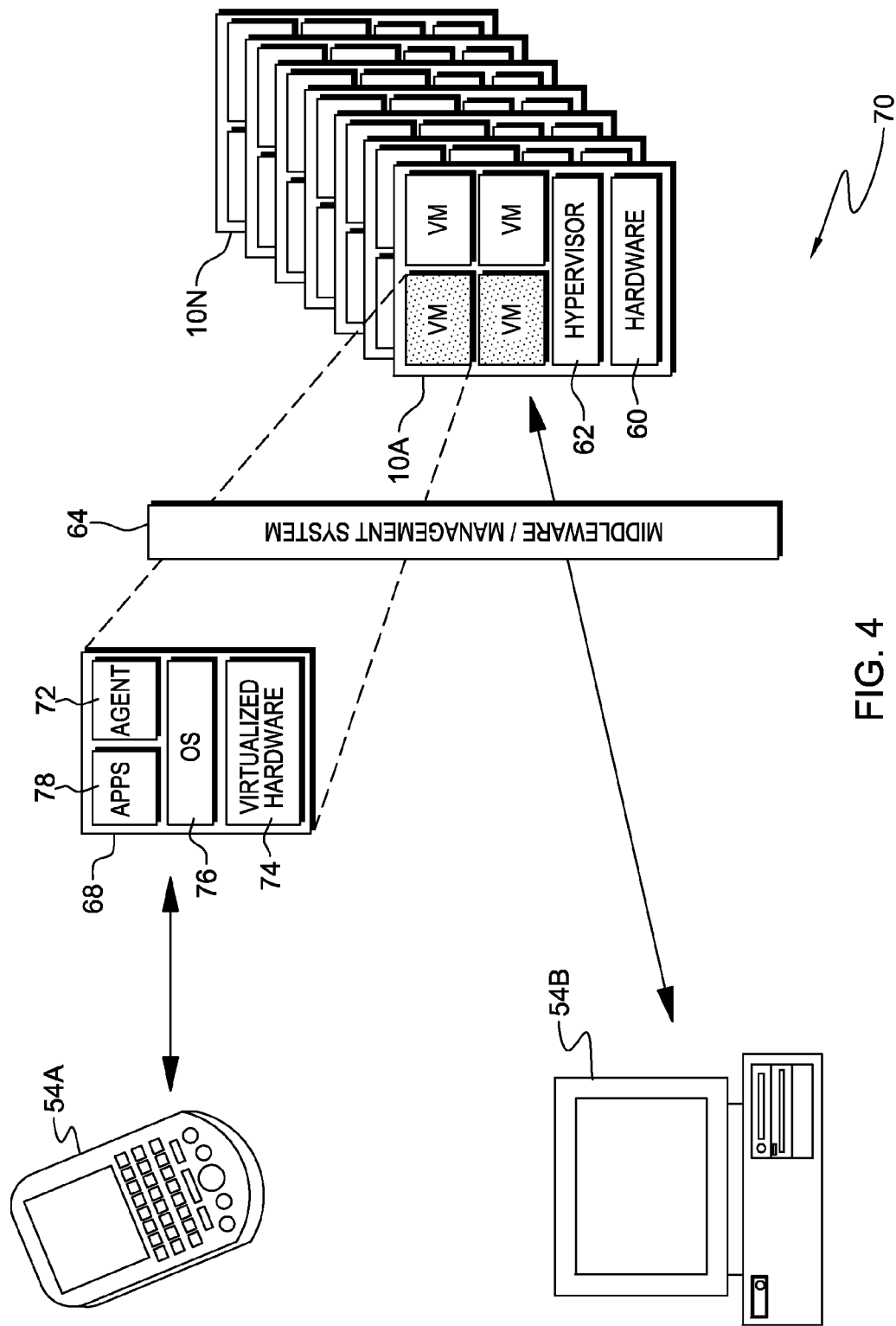
FIG. 4 shows an example of the target computing environment 70 for application to a preferred embodiment of the present invention.

FIG. 4 shows an example of the target computing environment 70 for application to a preferred embodiment of the present invention with reference to the cloud environment of FIGS. 1-3 with like features labeled identically. In the preferred computing environment 70 users at devices 54A, 54B interface through network messages with virtual machines 68 on networked servers 10A-10N. Each virtual machine 68 includes an optimization agent 72 providing environment feedback for adjusting the virtual environment 74, 76, 78 for each virtual machine 68 to improve overall system 70 efficiency. Each virtual machine 68 includes an optimization agent 72 collecting resource usage information on virtualized hardware 74, operating system(s) 76 and applications 78, which the optimization agent 72 passes to the respective server, 10A in this example. One software component 78 is a user interface for showing the user possible desktop reconfiguration options. The management system 64 in middleware cooperates with servers 10A-10N allocating resources, modifying allocations in response to reconfigurations, and informing each VM of improved desktop reconfigurations.

Thus, the present invention allows users at networked devices 54A, 54B to receive and accept virtual desktop reconfiguration, and provide feedback during use for determining a more optimized resource placement. Each User may be informed of possible virtual desktop reconfigurations on-the-fly according to feedback and respective usage profiles. Accepting a reconfiguration optimizes desktop placement and VM configuration in real time to reduce over-allocated and/or underused/unused resources. Minimizing configuration inefficiency allows data center hardware consolidation and processing capacity reduction for reduced energy use; or, increasing the number of users supported by each server. Thus, the present invention reduces the per user average power consumption in a particular data center, thereby reducing Information Technology (IT) administration costs. Moreover, administrators can better understand resource usage profiles for improved capacity planning quality.

Figure 5:
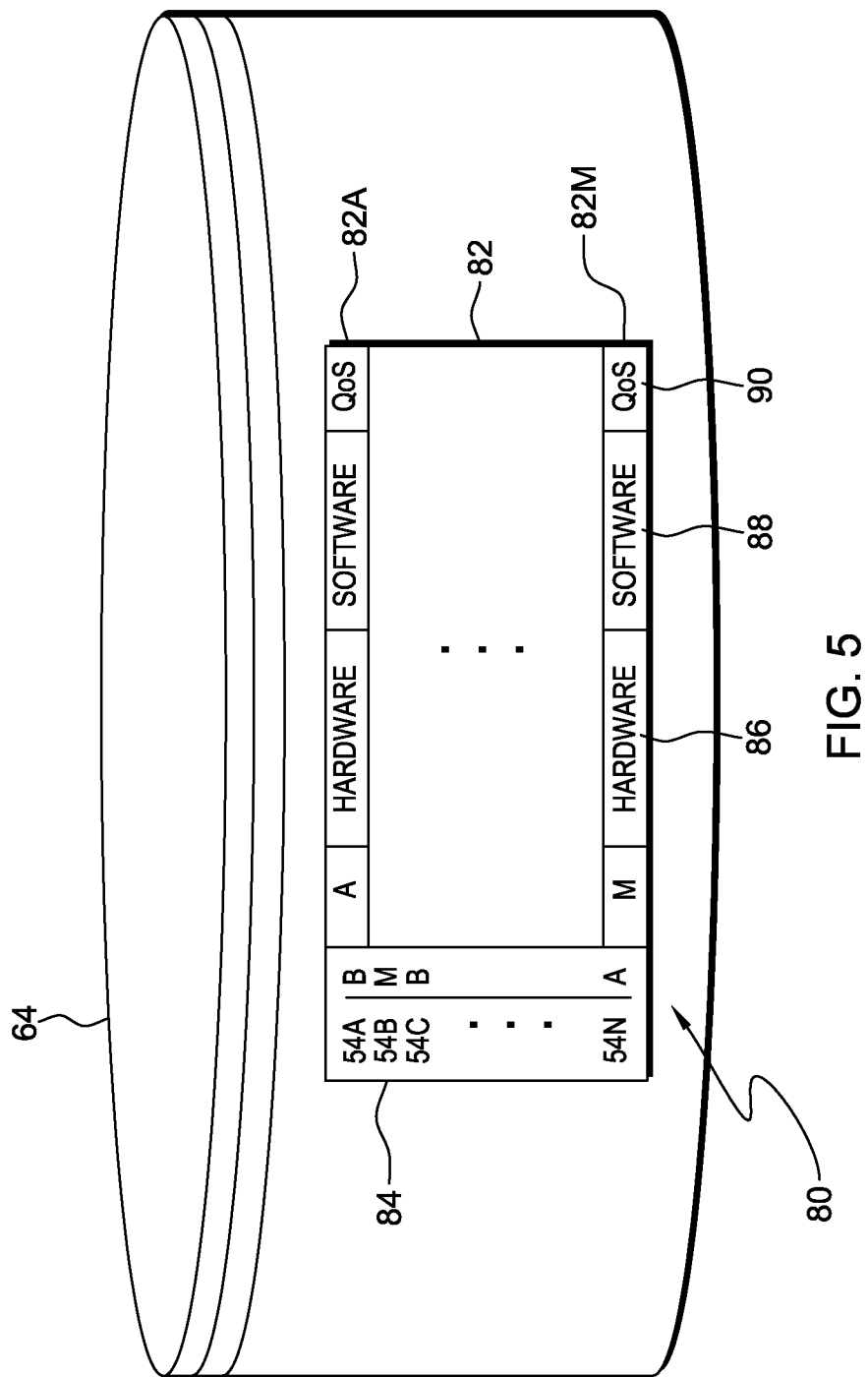
FIG. 5 shows an example of a group profile table of user profiles maintained by the management system for the entire group of an organization of server users.

FIG. 5 shows an example of a user profile table 80 that the management system 64 maintains for the entire group of an organization of server users. In this example, the user profile table 80 includes a menu of profiles 82 and a list of users 84 indicating profile assignment. The profile menu 82 includes a set of selectable VM profiles 82A-82M, that may be created initially by a system administrator, for example, and augmented or modified with use as described in more detail hereinbelow. Profiles in the profile menu 82 may also be updated using any suitable data mining technique, such as taught by Geng et al. "Interestingness measures for data mining: A survey" *ACM Computing Surveys* 2006. The user list 84 includes an entry for each VM and the profile assigned to the respective VM, either the initially assigned profile or the profile assigned as a result of subsequent reconfiguration. It should be noted that although the profile menu 82 and the user list 84 are shown and treated as a unified table 80, this is for simplicity of description only. It is understood that these two units may be, for example, separately and independently maintained.

In this example, each selectable VM profile 82A-82M, which may be assigned to one or more VMs for requesting users, contains hardware 86, software 88 and Quality-of-Service (QoS) 90 information. Typical hardware information 86 may indicate CPU, memory, disk, network, among other hardware requirements. Typical software information 88 may include a software systems stack and respective licenses. Typical QoS information 90 may include time to boot the desktop, or time to resume the desktop from standby mode. Each optimization agent 72 also maintains a local copy of the user profile table 80.

Figure 6A:
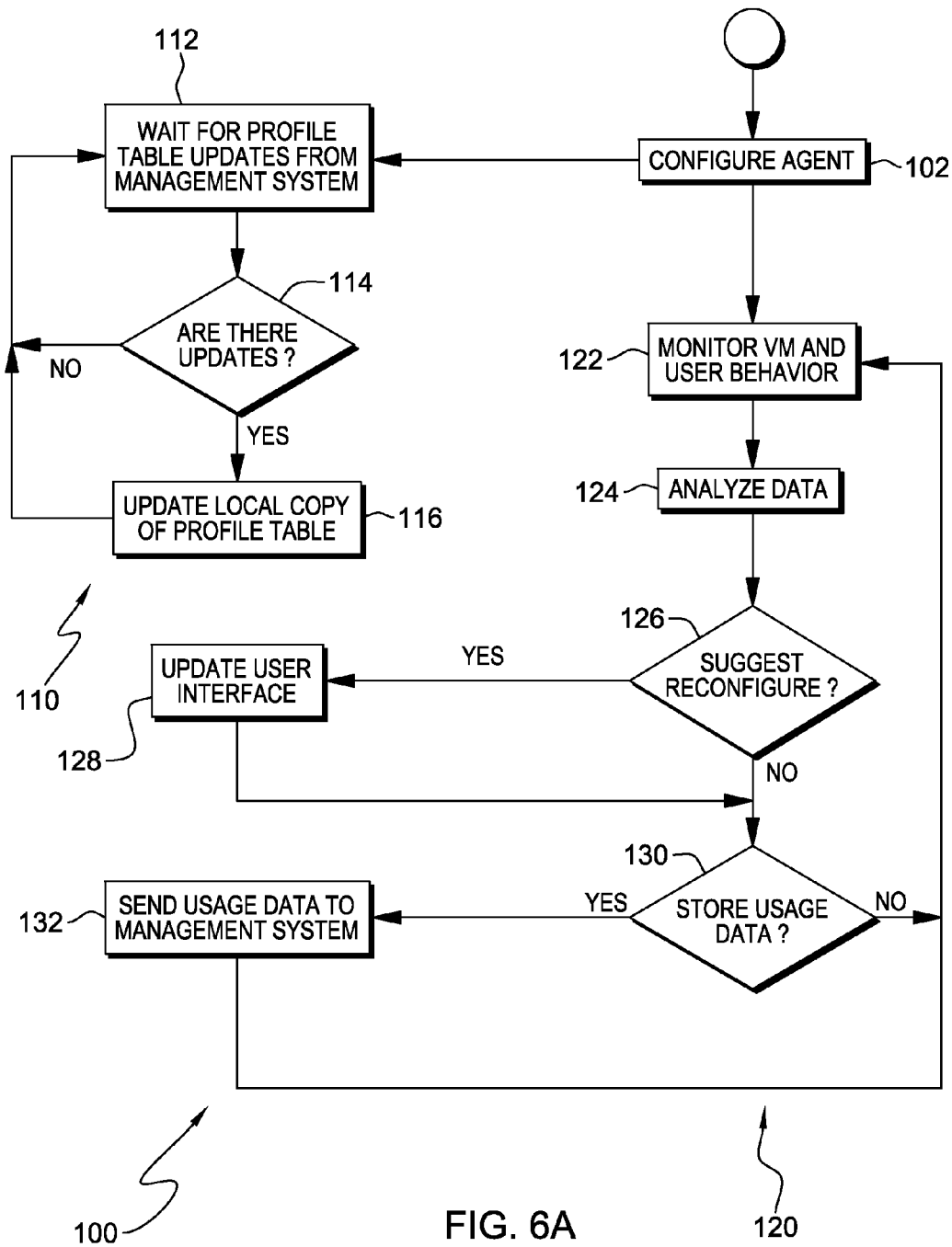
FIGS. 6A-B show an example of client devices configured initially using the latest profile table defined by the management system.
Figure 6B:
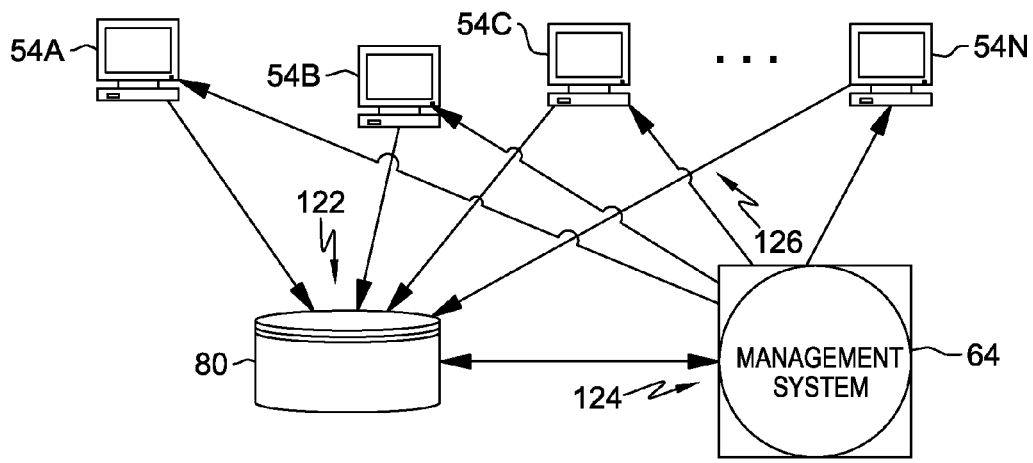

As shown in FIGS. 6A and 6B and with reference to FIGS. 4 and 5, first the management system 64 configures 100 a VM 68 for each device 54A, 54B, 54C, . . . , 54N requesting resources. In particular, the management system 64 assigns a profile 82A-82M from profile menu 82 to the respective device 54A, 54B, 54C, . . . , 54N in the user list 84. Once the device 54A, 54B, 54C, . . . , 54N is configured each respective optimization agent 72 manages two processes, a reconfiguration process 110 and a monitoring process 120, reflected in the data flow of FIG. 6A. In the reconfiguration process 110, the optimization agent 72 waits 112 for updates to the profile table 80 from the management system 64. If the management system 64 has provided an update 114, the optimization agent 72 applies the update 116.

In the monitoring process 120 the optimization agent 72 monitors 122 user activity and VM 68 behavior. The optimization agent 72 analyzes 124 data from monitoring to determine whether a reconfiguration suggestion 126 should be passed 128 to the user interface. Alternately, the user can suggest reconfiguring the desktop profile, e.g., if the user is dissatisfied with the current configuration. After making the suggestion 128, or if no suggestion is made, the optimization agent checks the data to determine 130 whether to store 132 the behavior data in the server 10A. Either after sending the behavior data 132 or if storing the behavior data is unnecessary, the optimization agent 72 returns to continue monitor 122 user activity and VM behavior.

Figure 7:
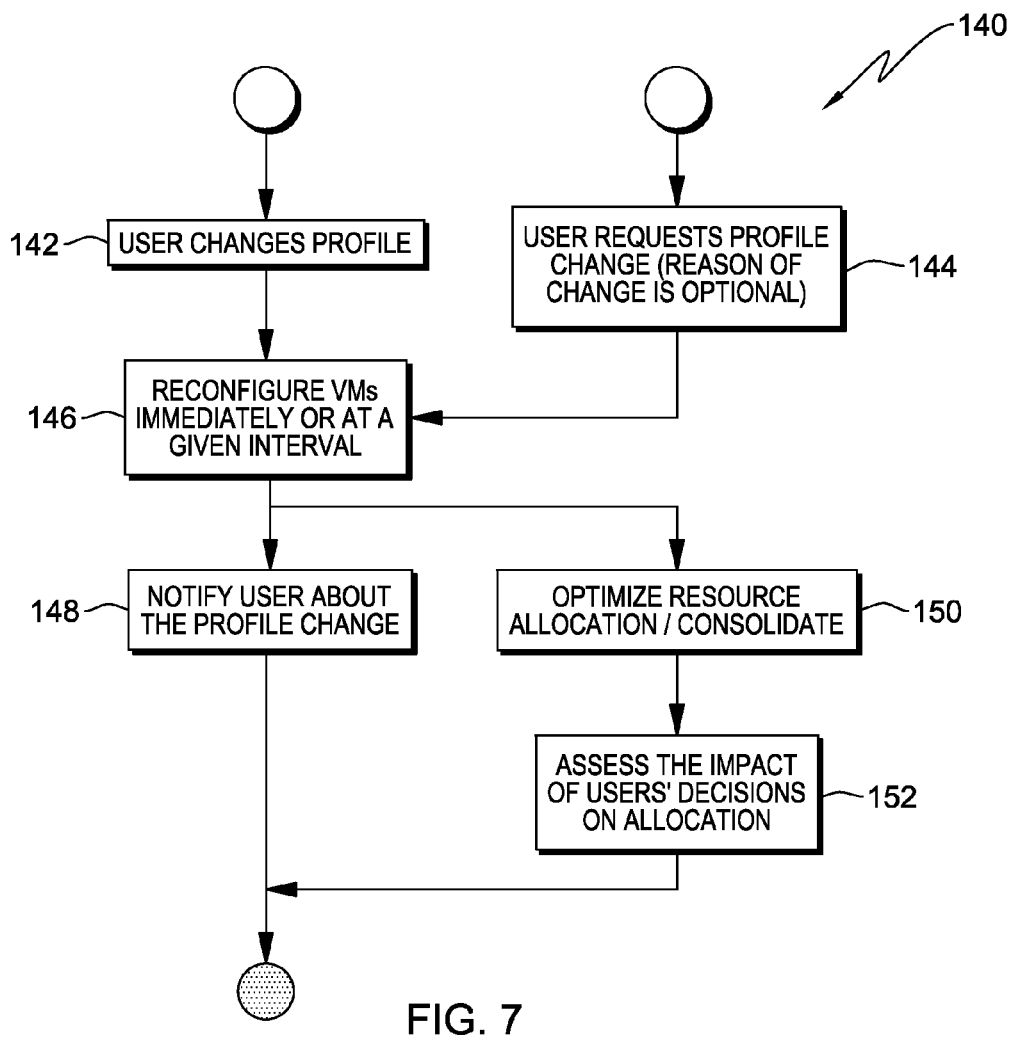
FIG. 7 shows an example of how the management system optimizes VM desktop placement on the physical servers, implemented using existing dynamic resource placement and suitable data mining solutions.

FIG. 7 shows an example of how the management system 64 optimizes 140 VM desktop placement on the physical servers 10A-10N, implemented using existing dynamic resource placement, for example. An example of dynamic resource placement is provided by Ferreto et al. "Server consolidation with migration control for virtualized data centers" *Future Generation Computer Systems,* 2011.

Figure 8A:
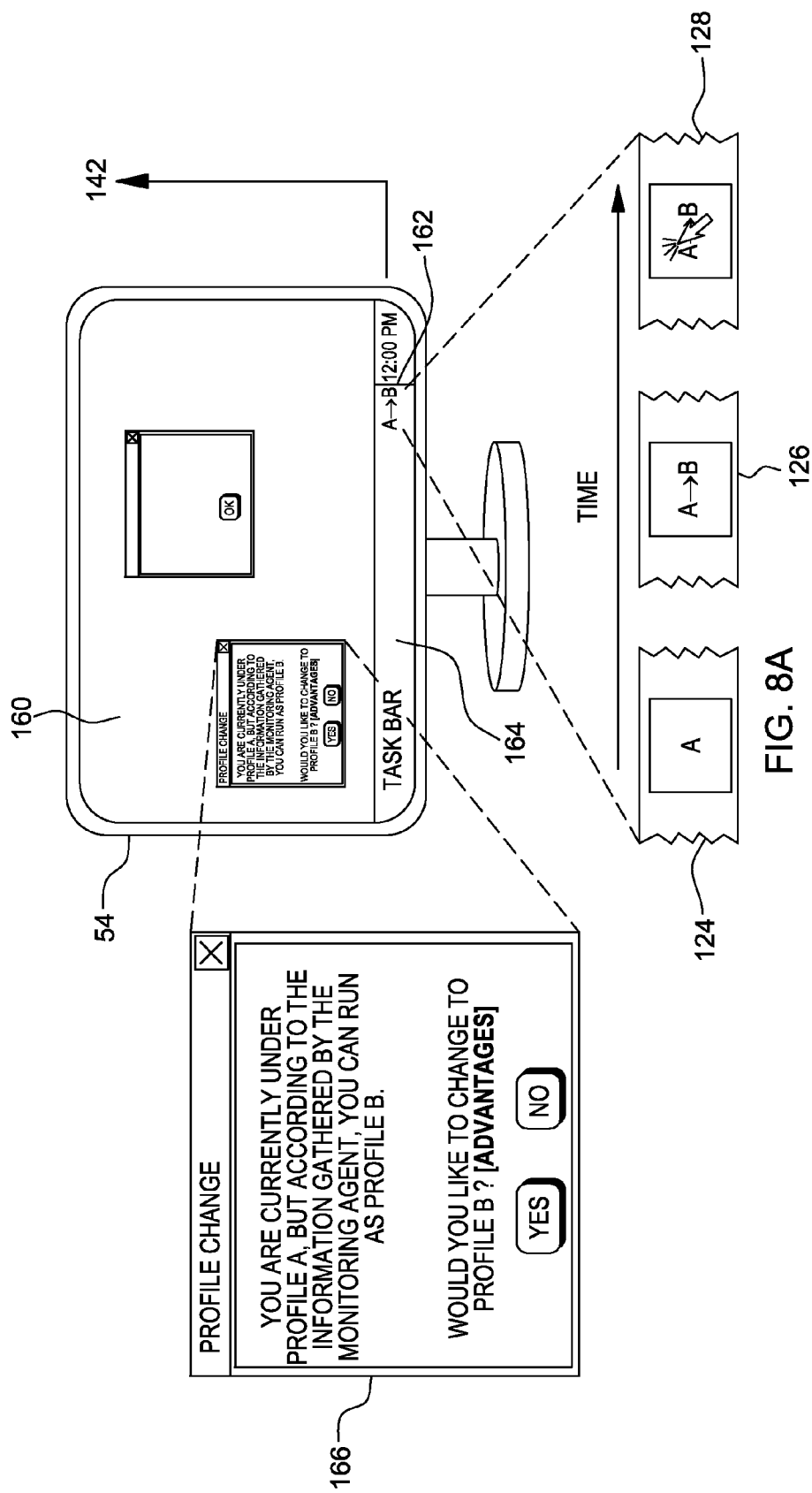
FIG. 8A shows a user interface or Graphical User Interface (GUI) on device desktop example during reconfiguration.

VM optimization 140 begins when either, the user changes 142 the profile in response to a suggestion from the optimization agent 72 as shown in FIG. 8A or, the user initiates 144 a profile change as shown in FIG. 8B. The management system 64 assigns a different profile in user list 84 to reconfigure 146 the respective VM, preferably immediately, or after a preselected interval. Then, the management system 64 passes a notification 148 of the user list 84 changes to the user's device 54A, 54B and optimizes data center resources 150, consolidating where possible. Finally, the management system 64 assesses the impact 152 of the user list 84 changes on resource allocation, e.g., determining power savings and/or added resource availability. The management system 64 can also adjust the profile menu 82 as needed based on VM usage and desktop behavior.

FIG. 8A shows an example of a user interface or Graphical User Interface (GUI) on desktop 160 of client device 54 during reconfiguration in steps 126 and 128 of FIG. 6A. A token 162 displayed on the desktop 160 indicates the current desktop configuration "A," e.g., textually in the task bar 164 in this example, or iconically. After analyzing user activity and VM behavior 124 with the current desktop "A" 160, a preferred optimization agent optimizes the configuration, tentatively reconfiguring to a more efficient, optimized desktop "B." The optimization agent changes the task bar token 162 from "A" to "A->B" and suggests a profile change 126 to optimized desktop "B," e.g., in a pop-up window 166.

In this example, pop-up window 166 offers the user the option of exploring the advantages of migrating to optimized desktop "B." The user can select more detailed information, e.g., with a mouse click or using a voice command. If more detailed information is selected, the optimization agent presents the user with an explanation of why the reconfiguration was suggested and possible impact of reconfiguring. If the user accepts the reconfiguration suggestion 128, e.g., clicking on the task bar token 162, the optimization agent provides feedback 142 to management system. The management system changes the profile designation for device 54 from "A" to "B" in the user list 84.

FIG. 8B shows an example of the user requesting another profile using the desktop 160 GUI on device 54 in FIG. 8A with like features labeled identically and with further reference to FIG. 7. In this example, the user has become dissatisfied with the current configuration "A," and clicks 144 on another desktop token 170. In this example, the current profile tagged with a minus sign, "–A" to indicate a requested change. The desktop 160 responds through the GUI, e.g., providing a pop-up window 172 that offers an opportunity to view alternate profiles. If the user responds in the positive, the desktop 160 may provide a list of profiles 82A-82M in the menu 82 through the GUI, that the user can select. The desktop 160 may also indicate the impact of using each, e.g., the cost and energy consumption associated with each menu profile 82A-82M. When the user selects a different configuration, the optimization agent returns 144 the selection to the management system. The management system uses the profile selection to reallocate resources and, optionally, refine the profile menu 82 to better meet future user resource needs and demands.

Thus advantageously, the present invention provides for client self-monitoring for adjusting individual resource allocation and configuration on-the-fly for optimized resource allocation in real time and with operating costs and energy use minimized.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
   a plurality of client devices, including a plurality of optimization agent client devices each including a graphical user interface (GUI) and an optimization agent monitoring resource usage and selectively suggesting resource configuration changes through said at least one client device, each optimization agent client device further monitoring user interaction with a respective device, analyzing monitored resource usage and interaction, and responsive to analysis
      suggesting changes to said resource configuration through said GUI, and
      receiving responses by said management system to suggested said resource configuration changes through said GUI;
   a plurality of provider computers in a cloud environment providing a management system, said management system selectively making resource capacity on said plurality of provider computers available to said plurality of client devices and interactively adjusting resource capacity available to said optimization agent client devices responsive to said optimization agent, said each optimization agent further receiving suggested resource configuration changes presented from the management system through said GUI; and
   a network connecting said plurality of client devices to said provider computers, said plurality of client devices and said provider computers passing messages to each other over said network.

2. A shared resource system as in claim 1, wherein said management system manages a profile table including a plurality of resource profiles and listing a profile selected for each optimization agent client device, each said resource profile indicating resources allocated to an assigned respective client device.

3. A shared resource system as in claim 2, wherein each said resource profile includes a hardware set, a software set and a Quality of Service set reflecting resources currently allocated to a respective said optimization agent client device.

4. A shared resource system as in claim 2, wherein whenever a suggested resource configuration change is accepted interactively, said optimization agent sends an updated resource profile selection message to said management system, said management system replacing the respective resource profile selection in a user list in said profile table with said updated resource profile selection.

5. A shared resource system as in claim 4, wherein said optimization agent maintains a local copy of said profile table and updates said local copy responsive to updates from said management system.

6. A method of optimizing computer resource allocation in real time, said method comprising:
   requesting allocation of cloud environment computer resources for a client device, said client device being one of a plurality of client devices, each including an optimization agent monitoring device operation and a graphical user interface (GUI);
   configuring said client device with requested resources;
   said optimization agent suggesting resource configuration changes responsive to monitored device operation, suggesting comprising:
      monitoring user interaction with a respective device,
      analyzing monitored resource usage and interaction,
      passing the analysis to a management system,
      suggesting changes to said resource configuration assignment through said GUI responsive to analysis, said optimization agent receiving suggested resource configuration changes through said GUI, and
      receiving interactive responses by said management system to each suggested resource reconfiguration through said GUI; and for each positive response
   updating a computer resource allocation for said client device, said client device being assigned a profile for said suggested resource reconfiguration.

7. A method of optimizing computer resource allocation in real time as in claim 6, wherein requesting resource allocation comprises providing a request to said management system, said management system assigning requested resources, said optimization agent receiving a resource profile assignment, said resource profile assignment indicating the current configuration profile of said client device, said management system entering the received said resource profile assignment in a profile table, said profile table including a resource profile assignment for each of a plurality of client devices.

8. A method of optimizing computer resource allocation in real time as in claim 6, wherein updating said resource allocation comprises whenever a suggested resource configuration change is accepted:
   sending an updated resource profile assignment message to said management system, the updated resource profile assignment indicating a resource profile reflecting accepted changes to resource allocation, said management system replacing the respective resource profile assignment in said profile table with the updated assignment; and forwarding updates to optimization agents.

9. A method of optimizing computer resource allocation in real time as in claim 8, wherein said optimization agent maintains a local copy of said profile table and updating said resource further comprises waiting for updates from said management system, and updating said local copy responsive to updates received by said optimization agent from said management system.

10. A method of optimizing computer resource allocation in real time as in claim 7, further comprising said management system allocating resources in a cloud environment, selectively consolidating resources and assessing the impact of the updated configuration assignments on available resources.

11. A method of optimizing computer resource allocation in real time as in claim 7, wherein each said resource profile includes a hardware set, a software set and a Quality of Service set reflecting resources currently allocated to a respective said client device, said resource profile indicating resources currently allocated in a cloud environment to assigned respective client devices.

12. A computer program product for optimizing resource allocation, said computer program product comprising a non-transitory computer usable medium having computer readable program code stored thereon, said computer readable program code comprising:

computer readable program code means for self-monitoring device activity and resource usage for cloud resources configured for, and allocated to, a device;

computer readable program code means for self-analyzing monitored device activity and configured resource usage;

computer readable program code means for responsive to analysis suggesting assignment changes to said resource configuration assigned to said device;

computer readable program code means for receiving from the device interactive responses to suggested said resource configuration assignment changes;

computer readable program code means for a Graphical User Interface (GUI) presenting assignment change suggestions and receiving interactive responses to presented said assignment change suggestions; and computer readable program code means for forwarding said interactive responses through said GUI to a resource provider.

13. A computer program product for optimizing resource allocation as in claim 12, further comprising:

computer readable program code means for maintaining a local copy of a profile table on one or more provider computers, said profile table including a plurality of profiles and a profile assignment for each of a plurality of devices having resources allocated from said resource provider;

computer readable program code means for receiving profile assignment updates for other ones of said plurality of devices; and computer readable program code means for updating said profile table responsive to received said profile assignment updates.

14. A computer program product for optimizing resource allocation in a cloud environment as in claim 12, further comprising computer readable program code means for managing resource allocation receiving updated user profile assignment selections from client device, modifying assignment of allocated resources for each corresponding client device responsive to receipt of each updated assignment.

15. A computer program product for optimizing resource allocation in a cloud environment as in claim 14, wherein said computer readable program code means for managing resource allocation notifies client devices of resource profile assignment updates and assesses the impact of updates on system resources.

16. A computer program product for managing resource allocation in a cloud environment, said computer program product comprising a non-transitory computer usable medium having computer readable program code stored thereon, said computer readable program code comprising:

computer readable program code means for receiving requests for resources from a plurality of client devices;

computer readable program code means for self-monitoring device activity by a respective client device and resource usage for resources configured for, and allocated to, said client device;

computer readable program code means for self-analyzing monitored device activity and configured resource usage for said respective client device;

computer readable program code means for suggesting assignment changes to selection of a resource configuration assigned for said client device responsive to analysis;

computer readable program code means for receiving interactive responses to suggested said resource configuration assignment changes;

computer readable program code means for a Graphical User Interface (GUI) presenting assignment change suggestions and receiving interactive responses to presented said assignment change suggestions;

computer readable program code means for forwarding said interactive responses for modification through said GUI;

computer readable program code means for receiving updated user profile assignments from ones of said plurality of client devices; and computer readable program code means for replacing assignment of a resource profiles for said ones responsive to receipt of each updated user profile assignment.

17. A computer program product for managing resource allocation in a cloud environment as in claim 16, wherein said computer readable program code means for modifying resources comprises computer readable program code means for replacing assignment at a selected interval.

18. A computer program product for managing resource allocation in a cloud environment as in claim 16, further comprising;

computer readable program code means for notifying client devices of resource profile assignment updates; and computer readable program code means for assessing the impact of updates on system resources.

19. A computer program product for managing resource allocation in a cloud environment as in claim 18, further comprising:

computer readable program code means for maintaining a local copy of a profile table in said client device, said profile table including a plurality of resource profiles and an assignment of one of said plurality of resource profiles for each of one or more client devices;

computer readable program code means for receiving profile interactive assignment updates by each of said one or more client devices for other ones of said one or more client devices; and computer readable program code means for updating said profile table in said client device responsive to received said profile assignment updates.

\* \* \* \* \*